US012579608B2

(12) United States Patent
Batra et al.

(10) Patent No.: US 12,579,608 B2
(45) Date of Patent: Mar. 17, 2026

(54) GENERATING TILE-ABLE PATTERNS FROM TEXT

(71) Applicant: ADOBE INC., San Jose, CA (US)

(72) Inventors: Vineet Batra, Delhi (IN); Sumit Chaturvedi, New Haven, CT (US); Abhishek Rai, Uttar Pradesh (IN); Pranav Vineet Aggarwal, Santa Clara, CA (US); Ajinkya Gorakhnath Kale, San Jose, CA (US); Aman Jeph, Uttar Pradesh (IN); Ankit Phogat, Haryana (IN); Sumit Dhingra, New Delhi (IN); Fengbin Chen, Los Gatos, CA (US); Kshitiz Garg, Santa Clara, CA (US); Milos Hasan, Lafayette, CA (US); Midhun Harikumar, Sunnyvale, CA (US); Gaurav Suresh Pathak, Santa Clara, CA (US); Souymodip Chakraborty, Bangalore (IN)

(73) Assignee: ADOBE INC., San Jose, CA (US)

( * ) Notice: Subject to any disclaimer, the term of this patent is extended or adjusted under 35 U.S.C. 154(b) by 177 days.

(21) Appl. No.: 18/526,855

(22) Filed: Dec. 1, 2023

(65) Prior Publication Data

US 2024/0420389 A1 Dec. 19, 2024

Related U.S. Application Data

(60) Provisional application No. 63/507,808, filed on Jun. 13, 2023.

(51) Int. Cl.
*G06T 3/4038* (2024.01)
*G06F 40/40* (2020.01)
(Continued)

(52) U.S. Cl.
CPC .............. *G06T 3/4038* (2013.01); *G06T 3/40* (2013.01); *G06T 11/001* (2013.01); *G06F 40/40* (2020.01);
(Continued)

(58) Field of Classification Search
None
See application file for complete search history.

(56) References Cited

U.S. PATENT DOCUMENTS

2021/0312590 A1* 10/2021 Beri ....................... G06T 3/4084
2022/0141395 A1* 5/2022 Sadalgi ............... H04N 23/632
345/633

(Continued)

OTHER PUBLICATIONS

"Material Maker", found on the internet at https://www.materialmaker.org/, Accessed May 26, 2023, 2 pages.
(Continued)

*Primary Examiner* — Jeffrey J Chow
(74) *Attorney, Agent, or Firm* — F. CHAU & ASSOCIATES, LLC

(57) ABSTRACT

Systems and methods for generating tile-able patterns from text include obtaining a text prompt and generating, by a generation prior model, a latent vector based on the text prompt, where the generation prior model is trained to output vectors within a distribution of tile-able patterns. An image generation model then generates an output image based on the latent vector. The output image comprises a tile-able pattern including an element from the text prompt.

20 Claims, 16 Drawing Sheets

(51) Int. Cl.
　　 G06T 3/40 　　　　 (2024.01)
　　 G06T 11/00 　　　 (2006.01)
(52) U.S. Cl.
　　 CPC ...... *G06T 2200/24* (2013.01); *G06T 2200/32*
　　　　　　　　　　　　　　　　 (2013.01)

(56) References Cited

U.S. PATENT DOCUMENTS

2024/0221242 A1 *　 7/2024　 Greenen ................ G06V 10/82
2025/0245774 A1 *　 7/2025　 Kamath ........... G06K 19/06103

OTHER PUBLICATIONS

Balaji, et al., "eDiff-I: Text-to-Image Diffusion Models with an Ensemble of Expert Denoisers", arXiv preprint arXiv:2211. 01324v4 [cs.CV] Nov. 17, 2022, pp. 1-24.

Bergmann, et al., "Learning Texture Manifolds with the Periodic Spatial GAN", arXiv preprint arXiv:1705.06566v2 [cs.CV] Sep. 8, 2017, 10 pages.

Dhariwal, et al., "Diffusion Models Beat GANs on Image Synthesis", arXiv preprint arXiv:2105.05233v4 [cs.LG] Jun. 1, 2021, 44 pages.

Gatys, et al., "Texture Synthesis Using Convolutional Neural Networks", arXiv preprint arXiv:1505.07376v3 [cs.CV] Nov. 6, 2015, pp. 1-10.

Moore, "Stable diffusion with circular convolution", found on the internet at https://github.com/TomMoore515/material_stable_ diffusion, 2023, pp. 1-4.

* cited by examiner

"Isometric pattern" "Circuit board"

"Rainforest foliage" "Palm tree silhouettes"

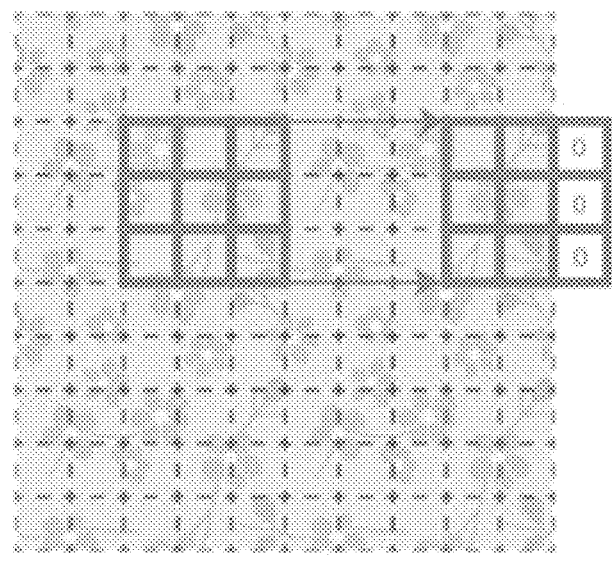
Conventional Zero Padding
Convolution 600
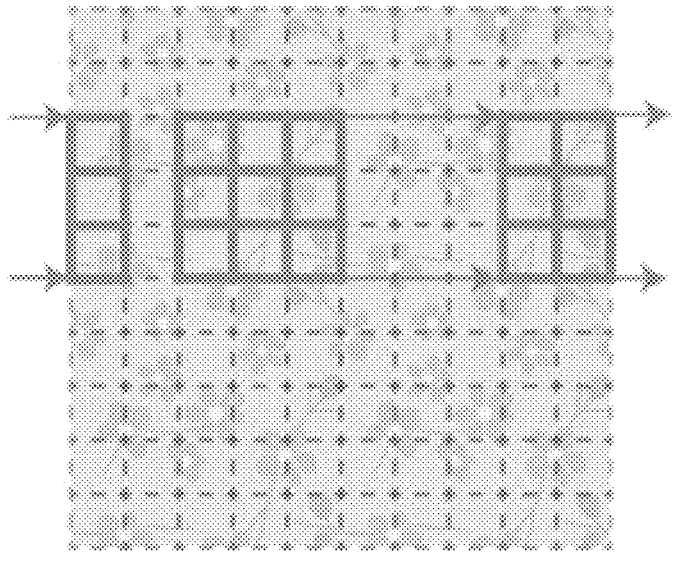
Circular Convolution
605
FIG. 6

Obtain text prompt — 905

Generate a latent vector based on the text prompt using a generation prior model — 910

Generate an output image based on the latent vector using an image generation model — 915

900

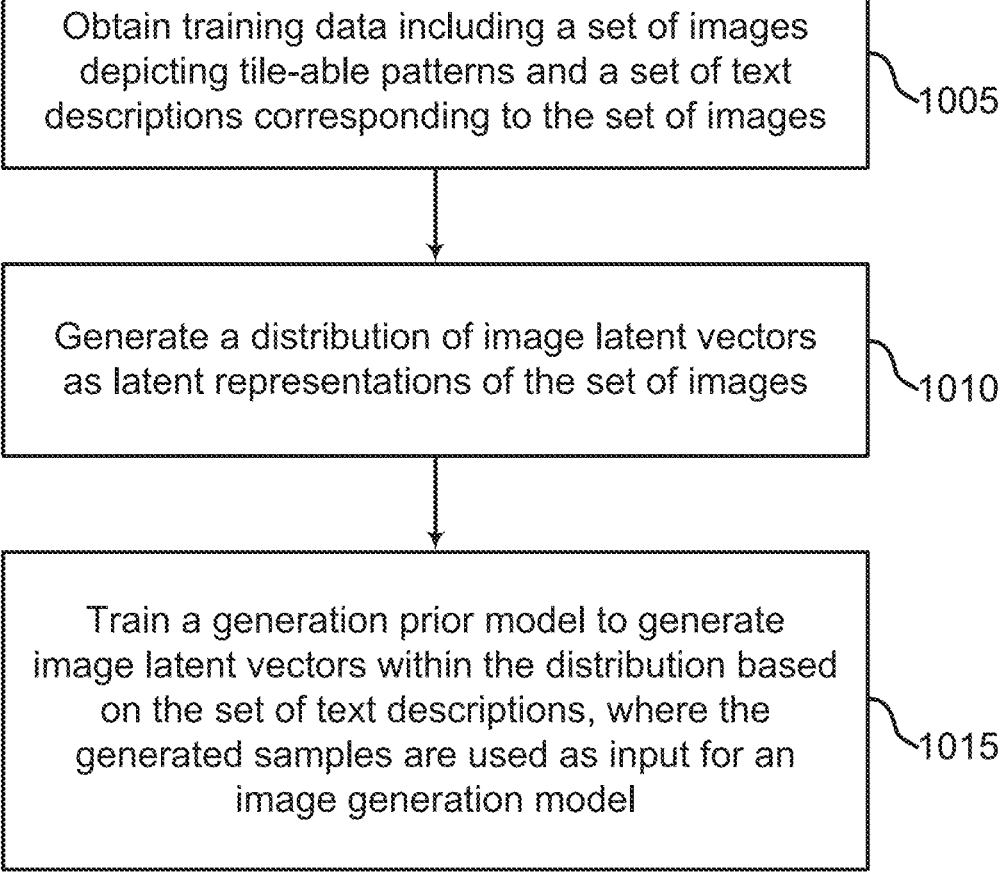

Obtain training data including a set of images depicting tile-able patterns and a set of text descriptions corresponding to the set of images

1005

Generate a distribution of image latent vectors as latent representations of the set of images

1010

Train a generation prior model to generate image latent vectors within the distribution based on the set of text descriptions, where the generated samples are used as input for an image generation model

Obtain an initial set of images        1105

Classify the initial set of images using a binary classifier model to obtain training data        1110

Train a generation prior model to generate latent vectors for an image generation model within a distribution of tile-able patterns based on the training data        1115

1100

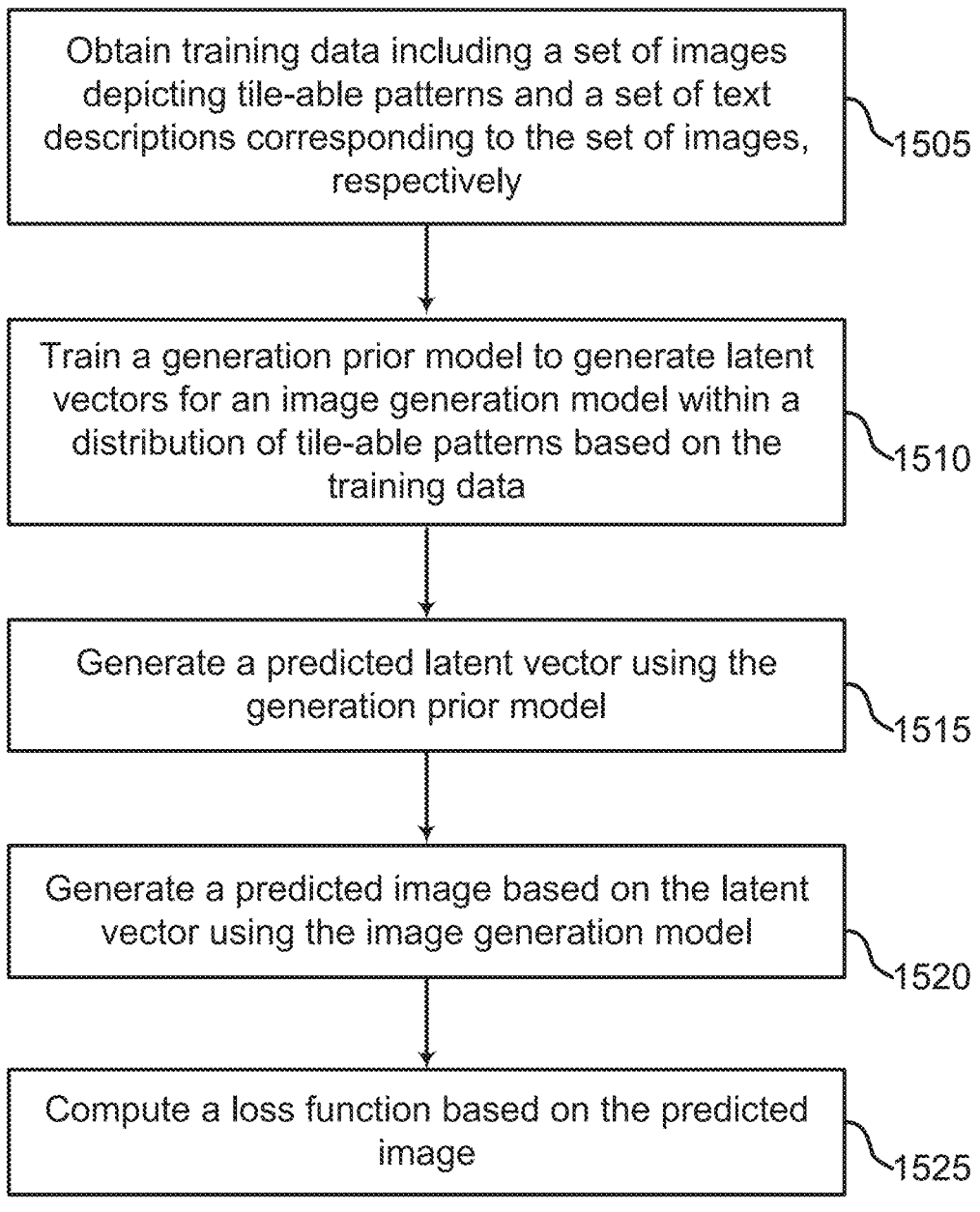

Obtain training data including a set of images depicting tile-able patterns and a set of text descriptions corresponding to the set of images, respectively ⌐1505

Train a generation prior model to generate latent vectors for an image generation model within a distribution of tile-able patterns based on the training data ⌐1510

Generate a predicted latent vector using the generation prior model ⌐1515

Generate a predicted image based on the latent vector using the image generation model ⌐1520

Compute a loss function based on the predicted image ⌐1525

Figure 16:
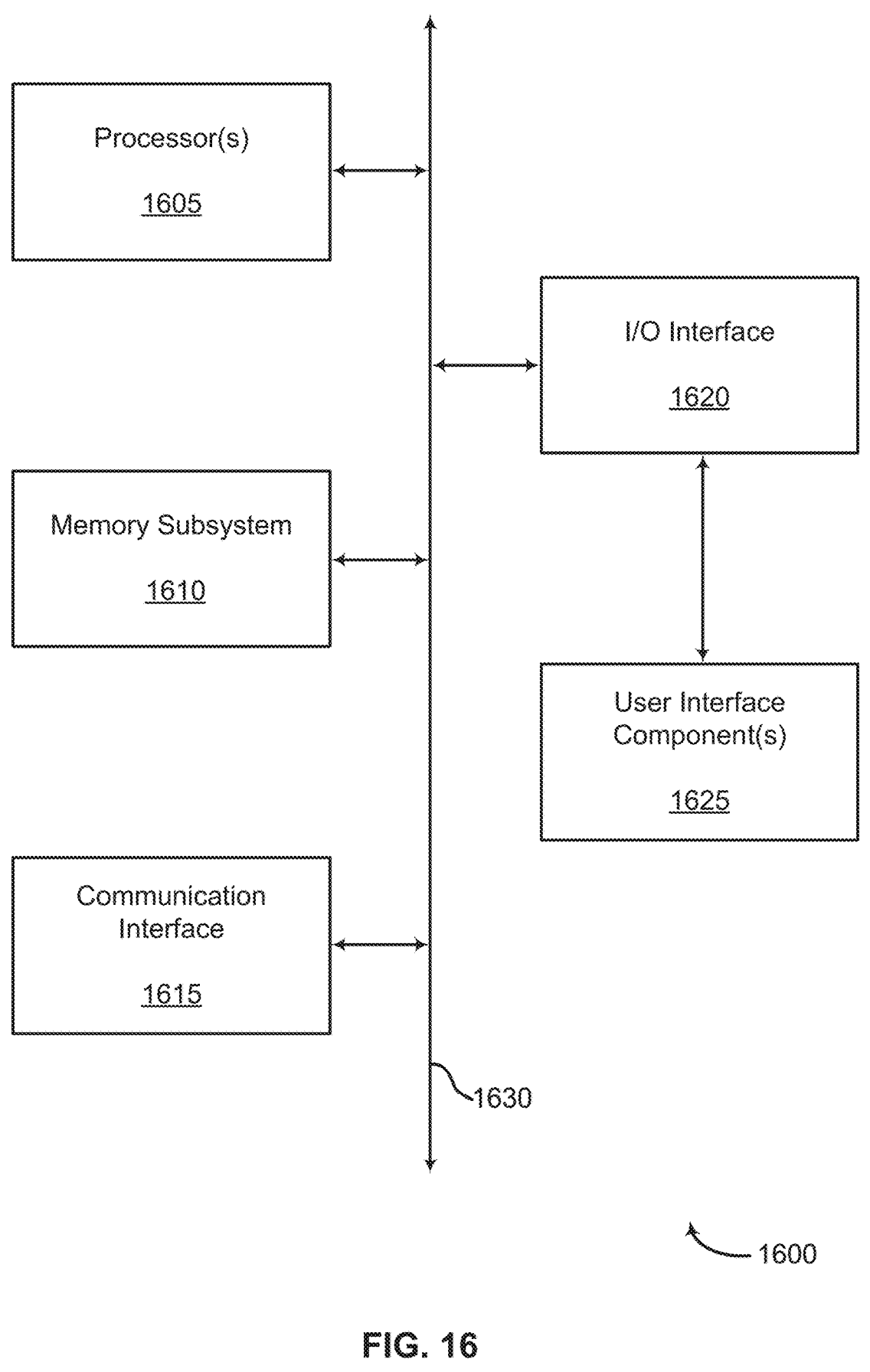

Processor(s)

1605

I/O Interface

1620

Memory Subsystem

1610

User Interface
Component(s)

1625

Communication
Interface

GENERATING TILE-ABLE PATTERNS FROM TEXT

CROSS-REFERENCE TO RELATED APPLICATION

This U.S. non-provisional application claims priority under 35 U.S.C. § 119 to U.S. Provisional Patent Application No. 63/507,808, filed on Jun. 13, 2023, in the United States Patent and Trademark Office, the disclosure of which is incorporated by reference herein in its entirety.

BACKGROUND

The following relates generally to image processing, and more specifically to image generation. Generative AI, a subfield of artificial intelligence, has been increasingly integrated into creative workflows, providing a transformative impact on industries ranging from digital art and design to entertainment and advertising. Image generation is one application of generative AI. Text-to-image generation aims to generate images from text descriptions. While generative models like GANs have traditionally been used for this task, recent advances have seen the application of diffusion models such as Denoising Diffusion Probabilistic Models (DDPMs) as well. DDPMs generate samples by transforming an initial random noise distribution into a data distribution over a series of time steps, and they have shown great promise in producing high-quality images. In some cases, a DDPM can be conditioned on a text description, such that the diffusion process generates images that match the text. However, in some cases, it may be difficult to control the overall aesthetic or style of the generated images using text alone.

SUMMARY

Embodiments described herein include systems and methods for generating tile-able patterns from text. As used herein, a "tile-able pattern" is an image that can be repeated seamlessly to fit an area. According to some aspects, a pattern generation system obtains a text prompt and encodes the text prompt to generate a prompt embedding. Embodiments include a generation prior model that is trained to generate a latent vector from the prompt embedding. In some cases, the latent vector is sampled from a learned cluster in an embedding space, where the region corresponding to the cluster includes vector representations of tile-able images. An image generation model generates an image based on the sampled latent vector. According to some aspects, the image generation model is further configured to perform a circular convolution operation during the generation process.

A method, apparatus, non-transitory computer readable medium, and system for image generation are described. One or more aspects of the method, apparatus, non-transitory computer readable medium, and system include obtaining a text prompt; generating, using a generation prior model, a latent vector based on the text prompt, wherein the generation prior model is trained to output vectors within a distribution of tile-able patterns; and generating, using an image generation model, an output image based on the latent vector, wherein the output image comprises a tile-able pattern including an element from the text prompt.

A method, apparatus, non-transitory computer readable medium, and system for image generation are described. One or more aspects of the method, apparatus, non-transitory computer readable medium, and system include obtaining training data including a plurality of images depicting tile-able patterns and a plurality of text descriptions corresponding to the plurality of images, respectively and training a generation prior model to generate latent vectors for an image generation model within a distribution of tile-able patterns based on the training data.

An apparatus, system, and method for image generation are described. One or more aspects of the apparatus, system, and method include at least one processor; at least one memory including instructions executable by the at least one processor; a generation prior model including parameters stored in the at least one memory and trained to output vectors within a distribution of tile-able patterns; and an image generation model including parameters stored in the at least one memory and trained to generate tile-able patterns based on output from the generation prior model.

BRIEF DESCRIPTION OF THE DRAWINGS

FIG. 6 shows an example of conventional zero-padding convolution and an example of circular convolution according to aspects of the present disclosure.

FIG. 10 shows an example of a method for training a machine learning model according to aspects of the present disclosure.

FIG. 15 shows an example of a method for training a generation prior model and an image generation model according to aspects of the present disclosure.

FIG. 16 shows an example of a computing device according to aspects of the present disclosure.

DETAILED DESCRIPTION

Figure 1:
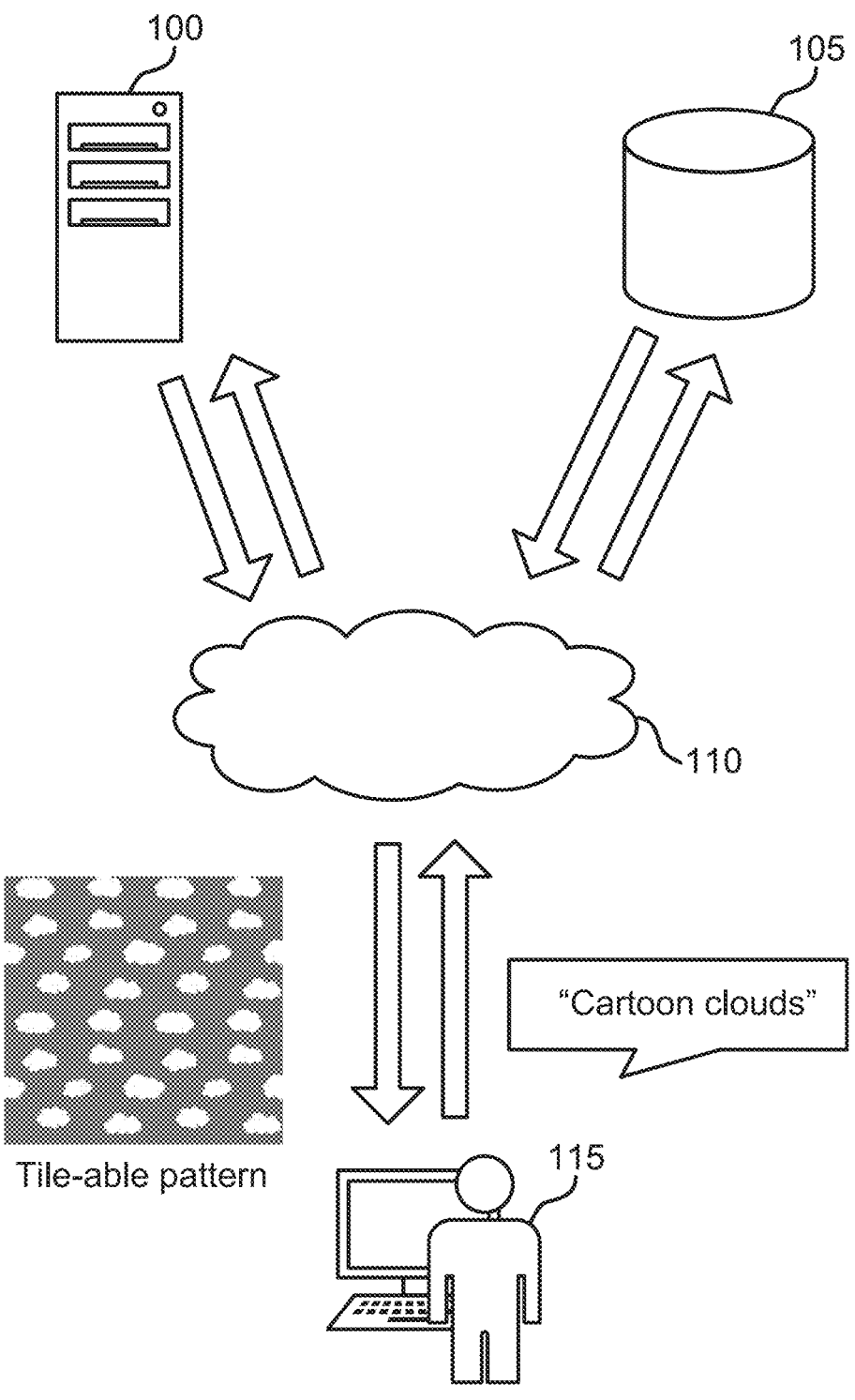
FIG. 1 shows an example of a pattern generation system according to aspects of the present disclosure.

A generative AI workflow may include a user who provides a text prompt to a generative model to yield a synthetic image. This synthetic image may be used in creative tasks, such as inpainting, outpainting, creating backgrounds, and the like. In some cases, a user wishes to use a tile-able pattern that can be repeated and scaled to fit an area. However, conventional generative models cannot reliably reproduce repeat-able patterns. The generated images will likely have visible seams if they are repeated along their boundaries.

Some methods involve using rule-based algorithms, such as procedural texture and texture synthesis techniques. However, these techniques are unable to achieve detailed textures, have size limitation issues, and cannot maintain semantic distinctions when merging multiple sources. Newer methods involve using machine learning (ML). For example, Generative Adversarial Networks (GANs) are able to generate photo-realistic images in a training process involving a generator network and a discriminator network. The generator network learns ML parameters to transform a noise vector into an image, and the discriminator network learns to classify the generated image as real (i.e., from training data) or fake (i.e., generated). However, GANs cannot easily be conditioned by a text-embedding, and are therefore typically not chosen for a text-to-image task.

Other ML models, such as diffusion models, perform a reverse diffusion process that gradually removes noise from an initial pure noise image to generate an image. Diffusion models differ from GANs, which use a noise vector as a seed that is transformed into an image through a one-pass generative process, with the noise not being directly manipulated but rather sculpted into data. Diffusion models, in contrast, start with noise and carefully remove it over many steps, using the model's predictions to guide the generation of images from a noisy state towards a clean state. This denoising process can be conditioned by guidance features such as a text embedding, and thus allows for greater customizability. However, conventional applications of diffusion models generally rely on prompt engineering-finding the best text prompt for the desired output—which is often not sufficient for generating complex and tile-able patterns. For example, the generated images are often not seamless when repeated, despite including "tile-able" or "pattern" in the prompt.

Embodiments of the disclosure include an improved image generation system that generates more accurate results for patterns (i.e., tileable images). Conventional models create patterns that do not match up at the edges, resulting in unwanted artifacts. By contrast, image generation systems described herein can take an object or element as an input and create a tileable pattern with repeated a variant of the input element that matches at the boundaries. This enables users to quickly and easily create patterns and backgrounds based on a wide variety of different styles and input images.

For example, embodiments of the present disclosure include a generation prior model that generates a latent vector in a region in latent space that corresponds to graphic patterns. An image generation model is conditioned using the latent vector, thereby generating an image that is a tile-able pattern and represents the text prompt. In some embodiments, the image generation model performs a circular convolution operation during the generation process, which can aid in the tile-ability of the generated images. Circular convolution includes using a convolving kernel that wraps around the boundaries of an image. Accordingly, embodiments improve on conventional image generation by enabling the generation of detailed and seamlessly tile-able patterns from text.

A pattern generation system is described with reference to FIGS. 1-7. Methods for generating tile-able patterns are described with reference to FIGS. 8-9. Training methods are described with reference to FIGS. 10-15. A computing device configured to implement a pattern generation apparatus is described with reference to FIG. 16.

Pattern Generation System

An apparatus for image generation is described. One or more aspects of the apparatus include at least one processor; at least one memory including instructions executable by the at least one processor; a generation prior model including parameters stored in the at least one memory and trained to output vectors within a distribution of tile-able patterns; and an image generation model including parameters stored in the at least one memory and trained to generate tile-able patterns based on output from the generation prior model.

In some aspects, the image generation model includes a diffusion model. The generation prior model may also include a diffusion model. In some aspects, the image generation model includes a circular convolution layer which performs a circular convolution operation. Some examples of the apparatus, system, and method further include a text encoder configured to encode a text prompt to obtain a text embedding. Some examples further include a training component configured to train the generation prior model. Some examples further include a binary classifier model configured to filter a dataset to obtain training data.

FIG. 1 shows an example of a pattern generation system according to aspects of the present disclosure. The example shown includes pattern generation apparatus 100, database 105, network 110, and user interface 115.

In an example use of the system, a user 115 provides a text prompt via a user interface. Network 110 transfers the text prompt to pattern generation apparatus 100, wherein it is processed. In some cases, database 105 stores information used by the system, such as prompts, training datasets, model parameters, and the like. Pattern generation apparatus 100 encodes the text prompt to generate a prompt embedding which is applied to a generation prior model to generate a latent vector. According to some aspects, the generation prior model is configured to learn a semantic mapping between the prompt and a region in latent space corresponding to graphic patterns. An image generation model generates a tile-able pattern using the latent vector as guidance, and the tile-able pattern is then provided back to the user. In some aspects, the generation is conditioned on the latent vector, the prompt embedding, and a noise vector.

One or more components of pattern generation apparatus 100 may be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, pattern generation apparatus 100 obtains training data including a set of images depicting tile-able patterns and a set of text descriptions corresponding to the set of images, respectively. In some examples, pattern generation apparatus 100 obtains an initial set of images, and a binary classifier filters the initial set of images to obtain the training data. Additional detail regarding an embodiment of pattern generation apparatus 100 is provided with reference to FIG. 2.

Database 105 is configured to store information used by pattern generation apparatus 100 such as images, model parameters, training data, user information, and data obtained through a user interface. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, user 115 interacts with database controller. In other cases, the database controller may operate automatically without user interaction.

Network 110 is configured to facilitate the transfer of information between pattern generation apparatus 100, database 105, and user 115, and may be referred to as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 enables a user to interact with the pattern generation system. The user interface 115 may prompt a user to provide a text input, and may display a generated tile-able pattern to the user. In some embodiments, the user interface 115 includes an audio device, such as an external speaker system, an external display device such as a display screen, or an input device (e.g., remote control device interfaced with the user interface directly or through an IO controller module). In some cases, a user interface may be a graphical user interface (GUI), such as a GUI that is a part of software or a web-app. According to some aspects, user interface 115 applies the output image to an image canvas using a brush tool of a GUI. An example of a GUI is described in greater detail with reference to FIG. 5.

Figure 2:
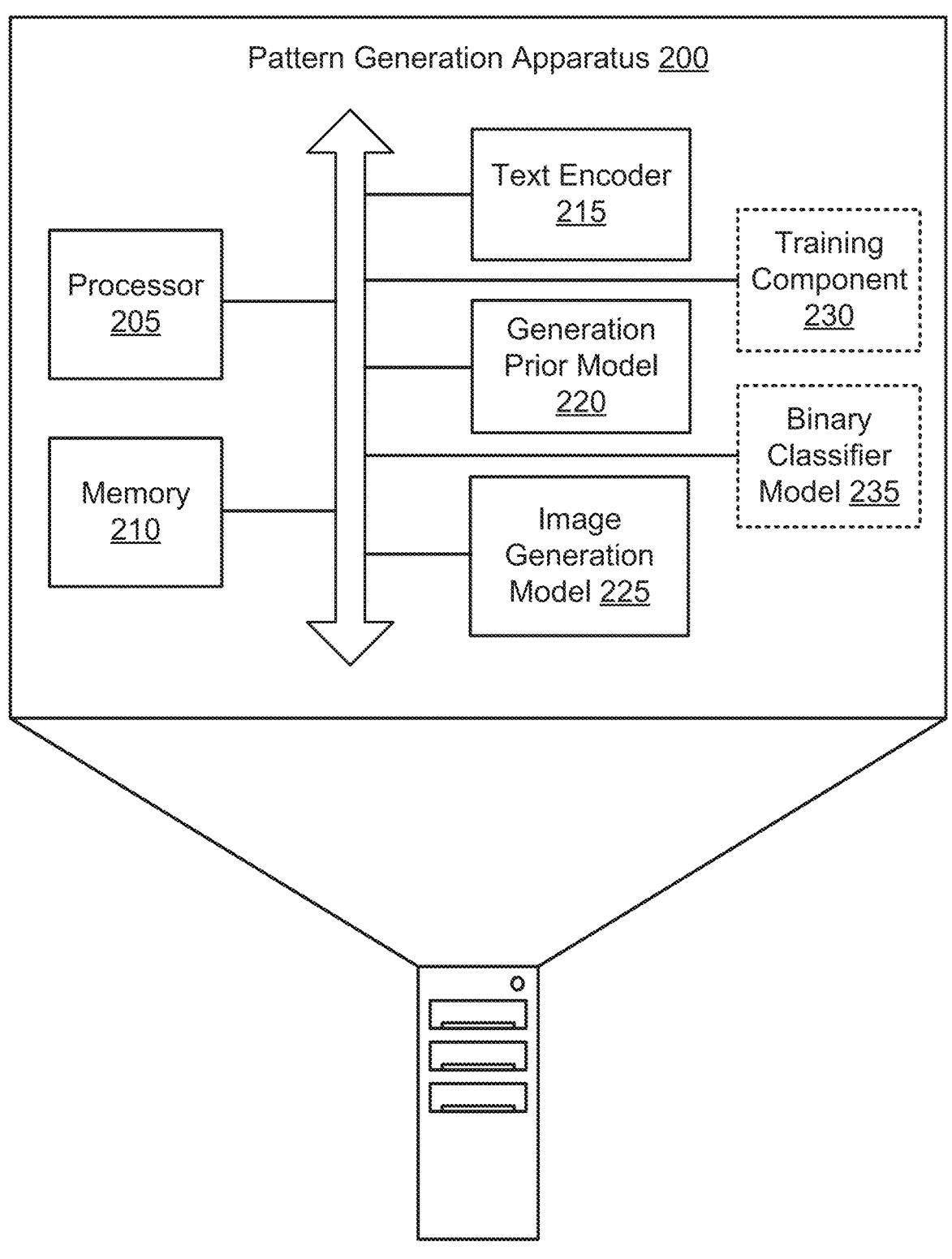
FIG. 2 shows an example of a pattern generation apparatus according to aspects of the present disclosure.

FIG. 2 shows an example of a pattern generation apparatus 200 according to aspects of the present disclosure. The example shown includes pattern generation apparatus 200, processor 205, memory 210, text encoder 215, generation prior model 220, image generation model 225, training component 230, and binary classifier model 235. Pattern generation apparatus 200 is an example of, or includes aspects of, the corresponding element described with reference to FIG. 1.

Embodiments of pattern generation apparatus 200 include several components and sub-components. These components are variously named, and are described so as to partition the functionality enabled by the processor(s) and the executable instructions included in the computing device used to implement pattern generation apparatus 200 (such as the computing device described with reference to FIG. 16). The partitions may be implemented physically, such as through the use of separate circuits or processors for each component, or may be implemented logically via the architecture of the code executable by the processors.

A processor 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

A memory 210 stores information used by the pattern generation apparatus 200, such as code executable by processor 205. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

One or more components of pattern generation apparatus include a learned model. The learned model include one or more artificial neural networks (ANNs). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Text encoder 215 is configured to generate a prompt embedding from a text prompt. According to some aspects, text encoder 215 processes variable length text to produce an embedding of constant size. The mapping from the input text to the embedding may be learned such that the generated embedding can be processed or decoded by another component downstream to produce desired data.

Embodiments of text encoder 215 include one or more transformers. A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

According to some aspects, text encoder 215 encodes a text prompt to obtain a text embedding, where a latent vector is generated based on the text embedding. Some embodiments of text encoder 215 include a multimodal encoder that is configured to process text and image data. According to some aspects, text encoder 205 is based on one or more networks included with the Contrastive Language-Image Pretraining (CLIP) model. Accordingly, some embodiments of text encoder 215 may process image data as well as text data, allowing patterns to be generated based on an input image. Text encoder 215 is an example of, or includes aspects of, the corresponding element described with reference to FIGS. 3 and 7.

Some components, such as the generation prior model 220, image generation model 225, the binary classifier model 235, or a combination thereof, may include a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. Some embodiments of image generation model 225 include a CNN configured to wrap the kernel around the image once a boundary is reached, as opposed to using, for example, zero-padding techniques.

Generation prior model 220 is configured to generate a latent vector based on text. In some embodiments, generation prior model 220 is configured to generate latent vectors in a CLIP space. The CLIP space generally has a text region corresponding to text embeddings, and an image region corresponding to image embeddings. In this way, images and text can be associated by finding the corresponding other-mode embedding within the space. In some aspects, generation prior model 220 generates the latent vector from the image region, also referred to as an image latent vector. According to some aspects, the generation is based on a diffusion process. Additional detail regarding an example diffusion model and diffusion process is provided with reference to FIG. 7.

According to some aspects, generation prior model 220 is trained to output vectors within a distribution of tile-able patterns. In some examples, generation prior model 220 generates a plurality of latent vectors based on the text prompt. In some examples, generation prior model 220 computes a plurality of similarity scores corresponding to the plurality of latent vectors, respectively, where the latent vector is selected from the plurality of latent vectors based on the plurality of similarity scores. Generation prior model 220 is an example of, or includes aspects of, the corresponding element described with reference to FIG. 3.

Image generation model 225 is configured to generate synthetic images. In some embodiments, image generation model 225 generates tile-able images, e.g., "patterns", based on a text prompt and a latent vector. In some aspects, the output image includes a set of repetitions of the tile-able pattern. Embodiments of image generation model 225 include a diffusion model, such as a latent diffusion model. In some examples, image generation model 225 performs a circular convolution. Additional detail regarding the circular convolution process is described with reference to FIG. 6. Image generation model 225 is an example of, or includes aspects of, the corresponding element described with reference to FIG. 3.

Training component 230 is configured to compute loss functions and to update model parameters of the other components in pattern generation apparatus 200. According to some aspects, training component 230 computes a loss function for a generation prior model 220 based on a training set. In some examples, training component 220 trains the generation prior model 220 to generate latent vectors in a distribution of tile-able patterns (e.g., latent representations of the tile-able patterns) based on the loss function. In at least one embodiment, training component 220 is implemented on an apparatus different from pattern generation apparatus 200. According to some aspects, training component 230 is configured to train the generation prior model 220 by updating its parameters through, e.g., backpropagation. Training component 230 is an example of, or includes aspects of, the corresponding element described with reference to FIG. 12.

Some embodiments of pattern generation apparatus 200 further include a binary classifier model 235 configured to classify images. According to some aspects, binary classifier model 235 classifies images as either suitable or unsuitable for training. According to some aspects, binary classifier model 235 is configured to filter a dataset to obtain a training set used for generation prior model 220 and/or image generation model 225. According to some aspects, a training phase for binary classifier 235 includes providing images of vector graphic-style patterns as a positive class, and providing images that include other content such as non-repeatable images (e.g., images that would have visible seams if repeated edge-to-edge) as a negative class. According to some aspects, the separate training phase of the binary classifier model 235 entails training a linear layer that is appended to a pre-trained CLIP backbone. Binary classifier model 235 is an example of, or includes aspects of, the corresponding element described with reference to FIGS. 12 and 13.

Figure 3:
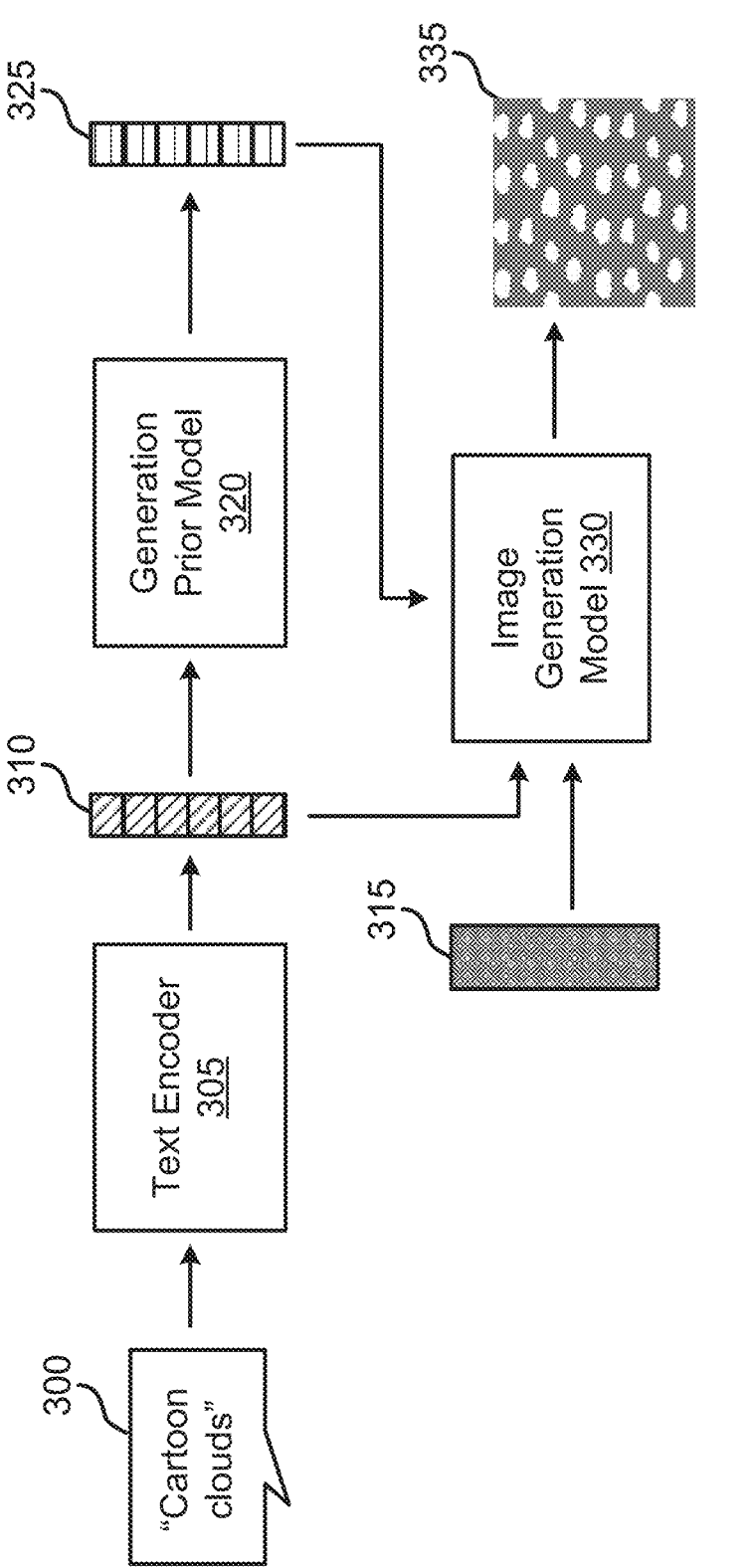
FIG. 3 shows an example of a pipeline for generating tile-able patterns according to aspects of the present disclosure.

FIG. 3 shows an example of a pipeline for generating tile-able patterns 335 according to aspects of the present disclosure. The example shown includes text prompt 300, text encoder 305, text embedding 310, noise vector 315, generation prior model 320, latent vector 325, image generation model 330, and tile-able pattern 335.

Text prompt 300 is an example of, or includes aspects of, the corresponding element described with reference to FIGS. 4 and 7. Text encoder 305 is an example of, or includes aspects of, the corresponding element described with reference to FIGS. 2 and 7. Generation prior model 320 and image generation model 330 are examples of, or include aspects of, the corresponding elements described with reference to FIG. 2.

In this example, the system obtains text prompt 300 and encodes text prompt 300 using text encoder 305 to produce text embedding 310 (referred to as "prompt embedding" elsewhere herein). Embodiments of text encoder 305 include a multimodal encoder configured to encode both text data and image data into a shared embedding space. Generation prior model 320 processes text embedding 310 to generate latent vector 325. Generation prior model may include, for example, a diffusion model, and may condition its generation (e.g., iterative sampling) using text embedding 310. According to some aspects, latent vector 325 is sampled from a latent space, and particularly, from a region in the latent space corresponding to tile-able graphic patterns.

According to some embodiments, generation prior model 320 samples a plurality of latent vectors from a text prompt. In one example, generation prior model 320 samples 8 latent vectors $X_i$ for a text prompt Y. As described with reference to FIG. 2, the latent vectors $X_i$ may be image latent vectors, e.g., vectors within an image region of an embedding space. Then, generation prior model 320 computes a dot product between the embedding $Y_{emb}$ of the text prompt and the 8 sampled latent vectors. In some embodiments, the image latent vectors are within the same embedding space as the prompt embedding $Y_{emb}$, and may be denoted as $X_{i_{emb}}$. The dot product may correspond to a similarity score between the prompt embedding $Y_{emb}$ and the image latent $X_{i_{emb}}$:

$$\text{score}_i = \frac{Y_{emb} \cdot X_{i_{emb}}}{\|Y_{emb}\| \|X_{i_{emb}}\|} \quad (1)$$

According to some aspects, generation prior model 320 selects one or more of the image latent vectors $X_i$ based on the computed scores for use.

Image generation model 330 processes latent vector 325 (which may comprise multiple of the top latent vectors as described above) to produce image data, e.g. tile-able pattern 335. According to some aspects, image generation model 330 includes a diffusion model. In some embodiments, the generation process of image generation model 330 is conditioned on both the latent vector 325 and text embedding 310. The generation process may begin with a noise vector 315 that is sampled from, e.g., a Gaussian noise distribution or another distribution. The tile-able pattern shown in the Figure may be a repeated image including four images in a 2×2 arrangement. This configuration of the generated images may be presented to the user to, for example, show the user that their generated pattern can be tiled seamlessly.

Figure 4:
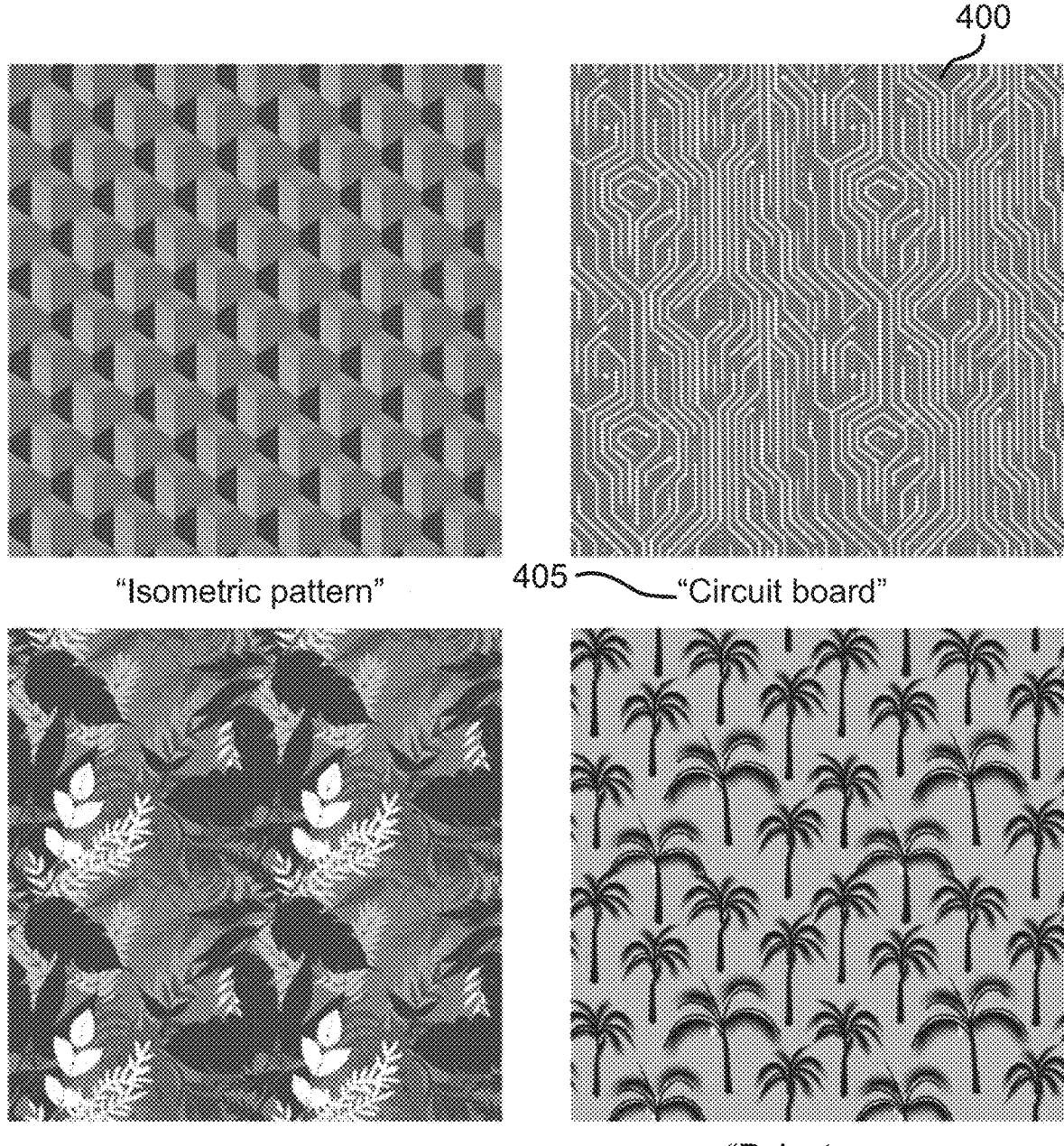
FIG. 4 shows an example of tile-able patterns according to aspects of the present disclosure.

FIG. 4 shows an example of tile-able patterns 400 according to aspects of the present disclosure. The example shown includes tile-able patterns 400 and text prompts 405.

Tile-able patterns 400 are examples of images that can be repeated seamlessly in horizontal and vertical directions. According to some aspects, tile-able patterns 400 are generated by embodiments of the present disclosure. For example, a pattern generation system including a generation prior model and an image generation model may generate the tile-able patterns 400 based on text prompts 405. The text prompts 405 indicate the texts that were used to generate each corresponding tile-able pattern (i.e., the tile-able pattern under which the text prompt is positioned).

Figure 5:
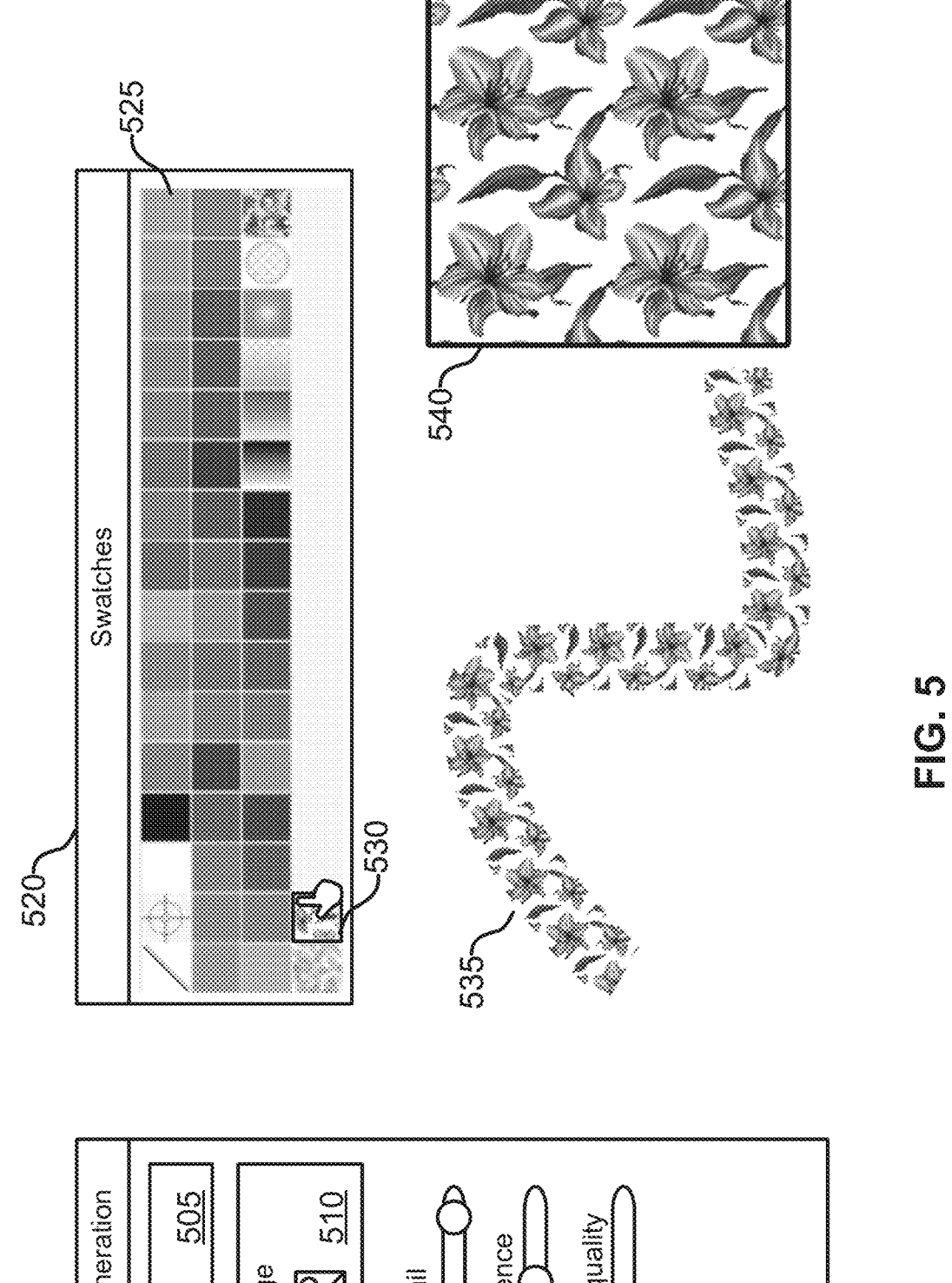
FIG. 5 shows an example of a graphical user interface according to aspects of the present disclosure.

FIG. 5 shows an example of a graphical user interface according to aspects of the present disclosure. The example shown includes generation window 500, swatch window 520, brush stroke 535, and pattern fill 540.

Generation window 500 includes one or more user interface (UI) elements that enable a user to customize the generation of a tile-able pattern. In one aspect, generation window 500 includes text field 505, image field 510, and configurable parameters 515. A user can input a text description or prompt that describes their desired pattern via text field 505. Image field 510 enables a user to upload or otherwise identify a reference image that will influence the desired pattern. Configurable parameters 515 include one or more UI elements that allow a user to influence the final output. Examples of configurable parameters include the level of detail in the generated design, the divergence of the generated design from the text or image prompt, and the sampling quality used in the generation, which may influence the number of iterations in the generation process, the sampling method used, or other adjustments to the reverse diffusion process.

Swatch window 520 enables the user to select a color or a previously generated pattern. In one aspect, swatch window 520 includes colors 525 and selected tile-able pattern 530. For example, a user may generate a "lily flowers" pattern, which is then placed within swatch window 520 as an icon. A user may select this icon to perform subsequent actions with the generated pattern. Examples of subsequent actions include brushing the pattern to form a stroke, such as brush stroke 535, and filling the pattern into an area, such as pattern fill 540.

FIG. 6 shows an example of conventional zero-padding convolution and an example of circular convolution according to aspects of the present disclosure. The example shown includes conventional zero padding convolution 600 and circular convolution 605.

In a convolution operation, a kernel (e.g., as represented by the 3×3 grid touching the lead line of the red number) may be convolved or "slid" across an image. This technique is often referred to as a "sliding window" technique, where the kernel is the "window" and can be shifted a configurable number of pixels at each step. The kernel may measure the values of the pixels within its window (e.g., such as the value of the red channel, the green channel, and the blue channel in an RGB image), and multiply those values by learned parameter(s) of a CNN. These multiplied values may be summed up for each position of the kernel and transferred to, e.g., the next layer in the CNN. This process may be repeated a number of times to generate latent representations of the image, also generally known as encoding the image.

In a conventional zero padding convolution 600, once the kernel has been slid across the entirety of the image, a signal is still measured at the boundary even when there are no pixels beneath the kernel. In this example, the kernel assumes zero values for the pixels that are missing. This is sometimes referred to as zero padding.

In circular convolution 605, the kernel does not assume zero values, and instead wraps around to the other side of the image such that the kernel has pixel information for all pixels at every position in the kernel. In some cases, using a circular convolution 605 in an image generation model ensures cohesive image content between one edge of the generated image and its opposite edge, allowing the generated image to be tiled seamlessly. Circular convolution 605 may be applied at both the left and right boundaries as well as the top and bottom boundaries.

Embodiments of an image generation model as described herein include a diffusion neural network. In some aspects, embodiments of a generation prior model also include a diffusion neural network; however, instead of outputting image data (e.g., pixel values), the generation prior model uses the diffusion process to output an image latent vector as described above.

Figure 7:
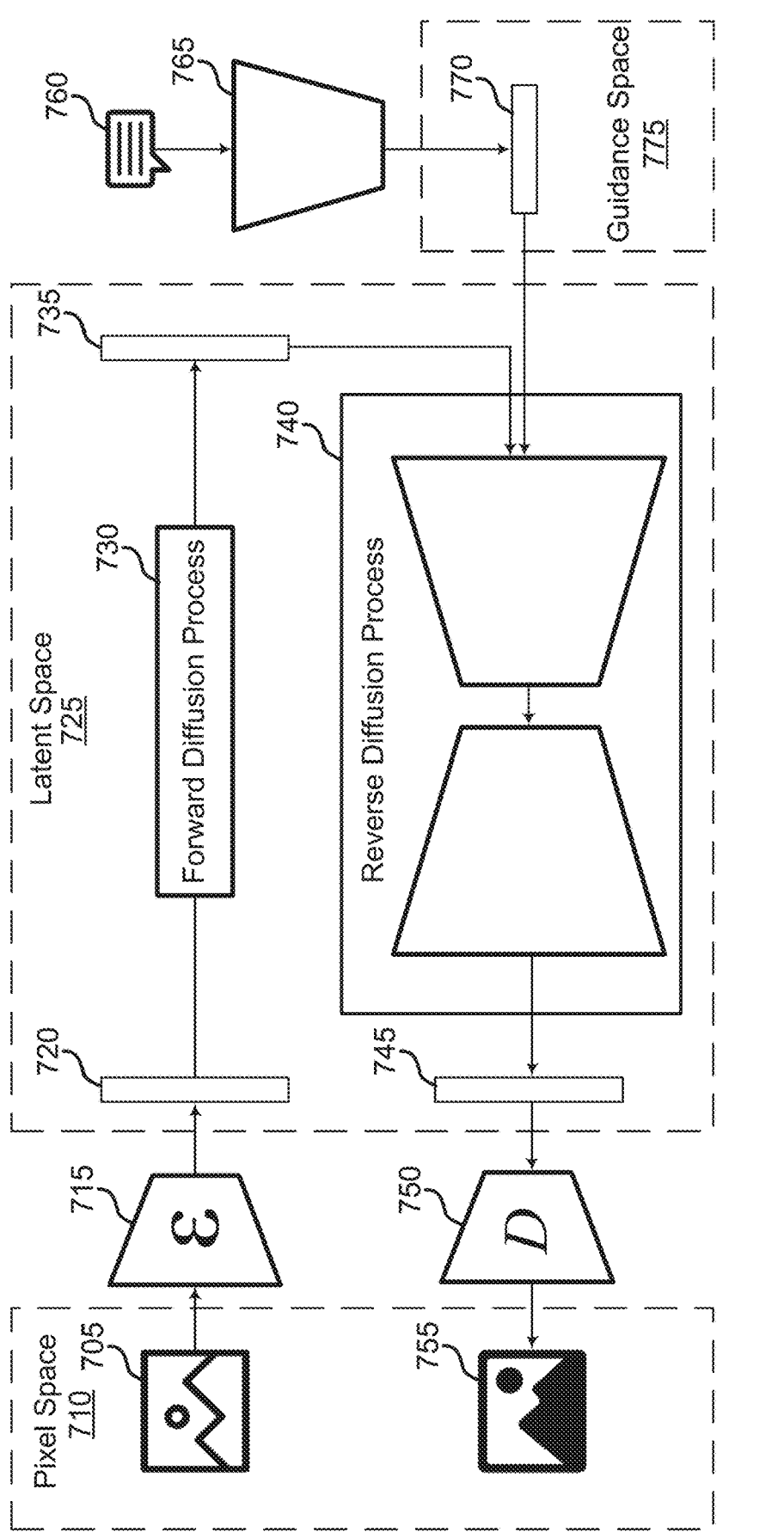
FIG. 7 shows an example of a diffusion neural network according to aspects of the present disclosure.

FIG. 7 shows an example of a diffusion neural network 700 according to aspects of the present disclosure. The example shown includes diffusion neural network 700, original image 705, pixel space 710, image encoder 715, original image features 720, latent space 725, forward diffusion process 730, noisy features 735, reverse diffusion process 740, denoised image features 745, image decoder 750, output image 755, text prompt 760, text encoder 765, guidance features 770, and guidance space 775.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. For example, a diffusion-based prior generation model may receive a text embedding as additional input features. A diffusion-based image generation model may receive the output from the diffusion-based prior generation model, e.g., a latent vector, as input features. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step t−1, the reverse diffusion process takes $x_t$, such as first intermediate image, and t as input. Here, t represents a step in the sequence of transitions associated with different noise levels, The reverse diffusion process outputs $x_{t-1}$, such as second intermediate image iteratively until $x_T$ is reverted back to $x_0$, the original image. The reverse process can be represented as:

$$p_\theta(x_{t-1} \mid x_t) := N(x_{t-1}; \mu_\theta(x_t, t), \Sigma_\theta(x_t, t)). \qquad (2)$$

The joint probability of a sequence of samples in the Markov chain can be written as a product of conditionals and the marginal probability:

$$x_T: p_\theta(x_{0:T}) := p(x_T)\prod_{t=1}^{T} p_\theta(x_{t-1} \mid x_t), \qquad (3)$$

where $p(x_T)=N(x_T; 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Generating Tile-Able Patterns

A method for generating tile-able patterns is described. One or more aspects of the method include obtaining a text prompt; generating, using a generation prior model, a latent vector based on the text prompt, wherein the generation prior model is trained to output vectors within a distribution of tile-able patterns; and generating, using an image generation model, an output image based on the latent vector, wherein the output image comprises a tile-able pattern including an element from the text prompt. Some examples of the method, apparatus, non-transitory computer readable medium, and system further include performing a circular convolution.

Some examples of the method, apparatus, non-transitory computer readable medium, and system further include encoding the text prompt to obtain a text embedding, wherein the latent vector is generated based on the text embedding. Some examples further include generating a plurality of latent vectors based on the text prompt. Some examples further include computing a plurality of similarity scores corresponding to the plurality of latent vectors, respectively, wherein the latent vector is selected from the plurality of latent vectors based on the plurality of similarity scores.

In some aspects, the generation prior model is trained based on a training set including a plurality of images depicting tile-able patterns. Some examples of the method, apparatus, non-transitory computer readable medium, and system further include performing a reverse diffusion process. In some aspects, the output image comprises a plurality of repetitions of the tile-able pattern. Some examples further include applying the output image to an image canvas using a brush tool.

Figure 8:
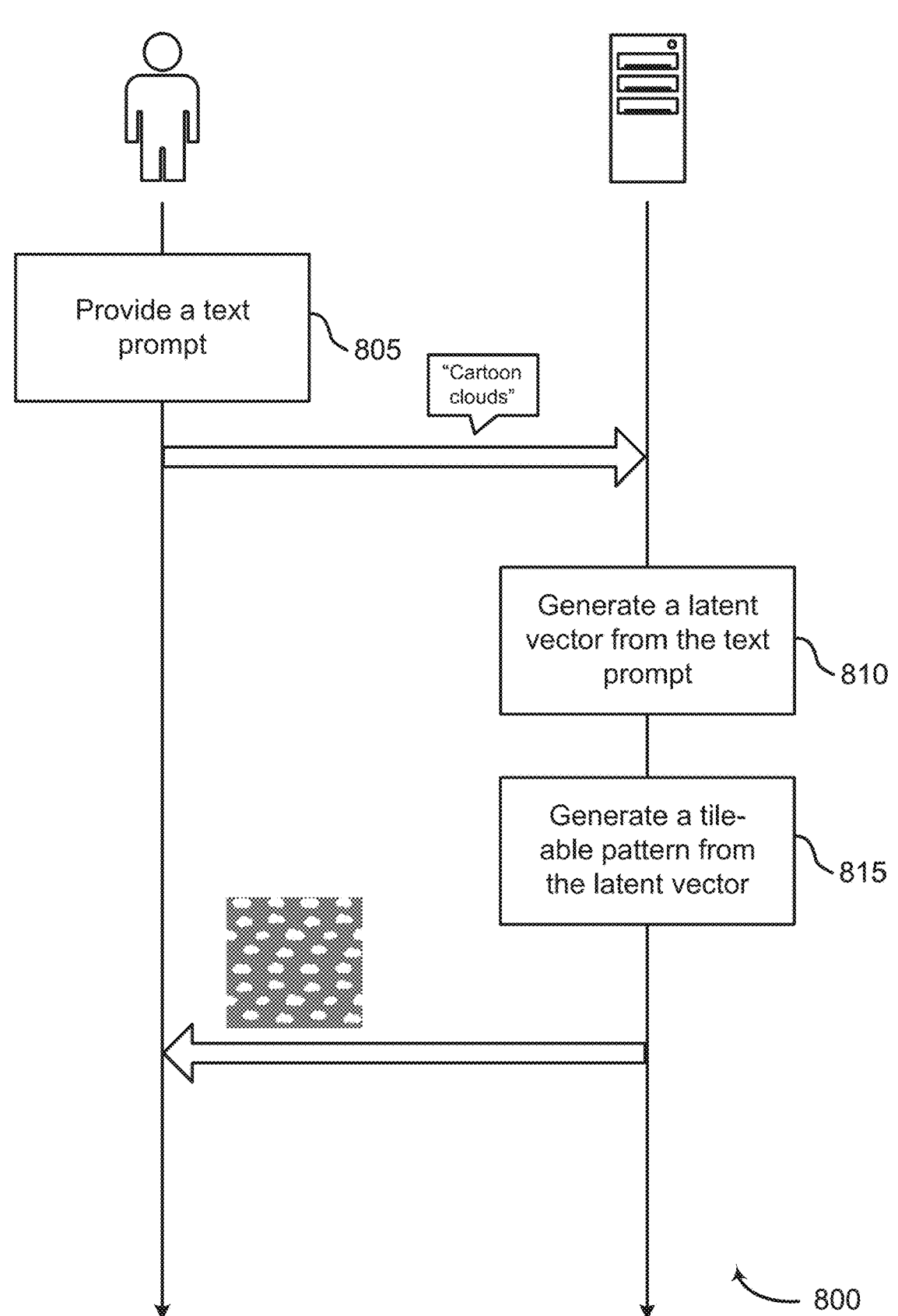
FIG. 8 shows an example of a method for providing a tile-able pattern to a user according to aspects of the present disclosure.

FIG. 8 shows an example of a method 800 for providing a tile-able pattern to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, a user provides a text prompt. For example, a user may provide the text prompt by entering a text description of an image into a GUI, such as the GUI described with reference to FIG. 5. In at least one embodiment, the user may additionally or alternatively add an image to the text prompt.

At operation 810, the system generates a latent vector from the text prompt. In some cases, the operations of this step refer to, or may be performed by, a generation prior model as described with reference to FIGS. 2 and 3. In one example, the system generates a plurality of latent vectors, compares each of the plurality of latent vectors to an embedding of the text prompt, and then chooses the latent vector that is the most similar to the text embedding.

In some cases, the user provides an indication that the output should be a tileable pattern, and the generation prior model is selected based on the user selection. In this example, the generation prior model may not be used if the user does not specify that a pattern output is desired.

At operation 815, the system generates a tile-able pattern from the latent vector. In some cases, the operations of this step refer to, or may be performed by, an image generation model as described with reference to FIGS. 2 and 3. Embodiments of the image generation model include a diffusion model configured to generate images using a reverse diffusion process, such as the process described with reference to FIG. 7. The system may then provide the tile-able pattern back to the user.

Figure 9:
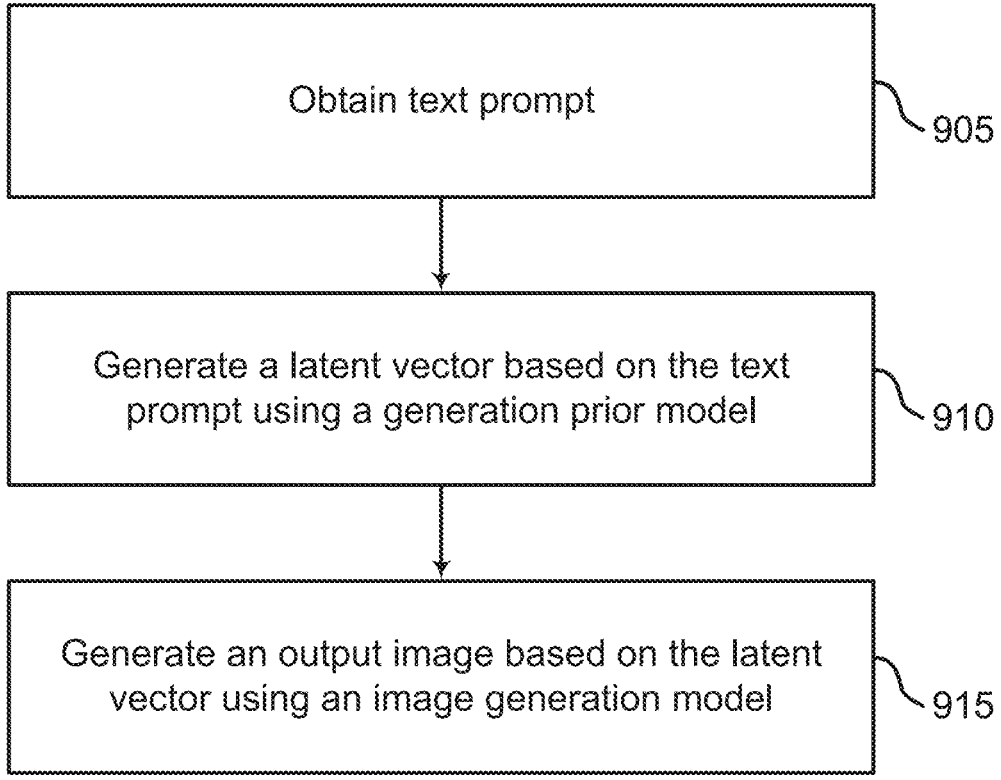
FIG. 9 shows an example of a method for generating a tile-able pattern according to aspects of the present disclosure.

FIG. 9 shows an example of a method 900 for generating a tile-able pattern according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains text prompt. In some cases, the operations of this step refer to, or may be performed by, a pattern generation apparatus as described with reference to FIGS. 1 and 2. A user may provide the text prompt via a user interface such as the GUI described with reference to FIG. 5. In some cases, the system obtains a text prompt from another source, such as an automatically generated text prompt from a language model.

At operation 910, the system generates a latent vector based on the text prompt using a generation prior model. In some cases, the operations of this step refer to, or may be performed by, a generation prior model as described with reference to FIGS. 2 and 3. Embodiments of the generation prior model include a diffusion model that is trained to generate latent vectors that represent features of tile-able patterns.

At operation 915, the system generates an output image based on the latent vector using an image generation model. In some cases, the operations of this step refer to, or may be performed by, an image generation model as described with reference to FIGS. 2 and 3. The output image may be seamlessly repeatable in vertical and horizontal directions, allowing the output image to be tiled to fill an area.

Training

A method for training a pattern generation apparatus is described. One or more aspects of the method include obtaining training data including a plurality of images depicting tile-able patterns and a plurality of text descriptions corresponding to the plurality of images, respectively and training a generation prior model to generate latent vectors for an image generation model within a distribution of tile-able patterns based on the training data.

Some examples of the method, apparatus, non-transitory computer readable medium, and system further include generating a predicted latent vector using the generation prior model. Some examples further include generating a predicted image based on the latent vector using the image generation model. Some examples further include computing a loss function based on the predicted image. In some cases, generating the predicted image further includes performing a circular convolution.

Some examples of the method, apparatus, non-transitory computer readable medium, and system further include encoding each of the plurality of text descriptions to obtain a plurality of text embeddings, wherein the training is based on the plurality of text embeddings. Some examples include obtaining an initial set of images. Some examples further include classifying the initial set of images using a binary classifier model to obtain the plurality of images used for training a generation prior model or an image generation model, or both.

FIG. 10 shows an example of a method 1000 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains training data including a set of images depicting tile-able patterns and a set of text descriptions corresponding to the set of images. In some cases, the operations of this step refer to, or may be performed by, a pattern generation apparatus as described with reference to FIGS. 1 and 2. The set of images includes a plurality of tile-able patterns, and the set of text descriptions includes descriptions for each of the plurality of tile-able patterns.

At operation 1010, the system generates a distribution of latent vectors as latent representations of the set of images. In some cases, the operations of this step refer to, or may be performed by, a training component as described with reference to FIGS. 2 and 12. For example, the training component include a pre-trained encoder configured to generate target image latent vectors from the set of images. The target image latent vectors are points in an embedding space, and the set of target image latent vectors forms a region in this embedding space. Latent vectors within this region will be representations of tile-able patterns and their associated features, such as clean lines, tile-ability, etc. The goal of training a generation prior model is to configure the generation prior model to generate samples within this region. For example, a generation prior model may receive an embedding of the text "lily flowers", and once it is trained, it will produce an image latent that is representative of a tile-able pattern, as opposed to, e.g., a hyper-realistic, non-tile-able image of lily flowers.

At operation 1015, the system trains a generation prior model to generate latent vectors within the distribution based on the set of text descriptions, where the generated latent vectors are used as input for an image generation model. In some aspects, the training component is configured to 1) generate target image latent vectors for training, 2) filter or augment images and descriptions to generate training data, 3) compute loss functions based on differences from the outputs of the models from the training data, and 4) update parameters of the models based on the computed loss functions. The training component may train the generation prior model to produce the target vectors based on embeddings of the set of text descriptions. In other words, the training enables the generation prior model to learn a mapping from the text prompts to a region of the embedding space with the target vectors. In this way, the generation prior model is trained to produce latent vectors within a region of the embedding space that represents tile-able patterns.

Figure 11:
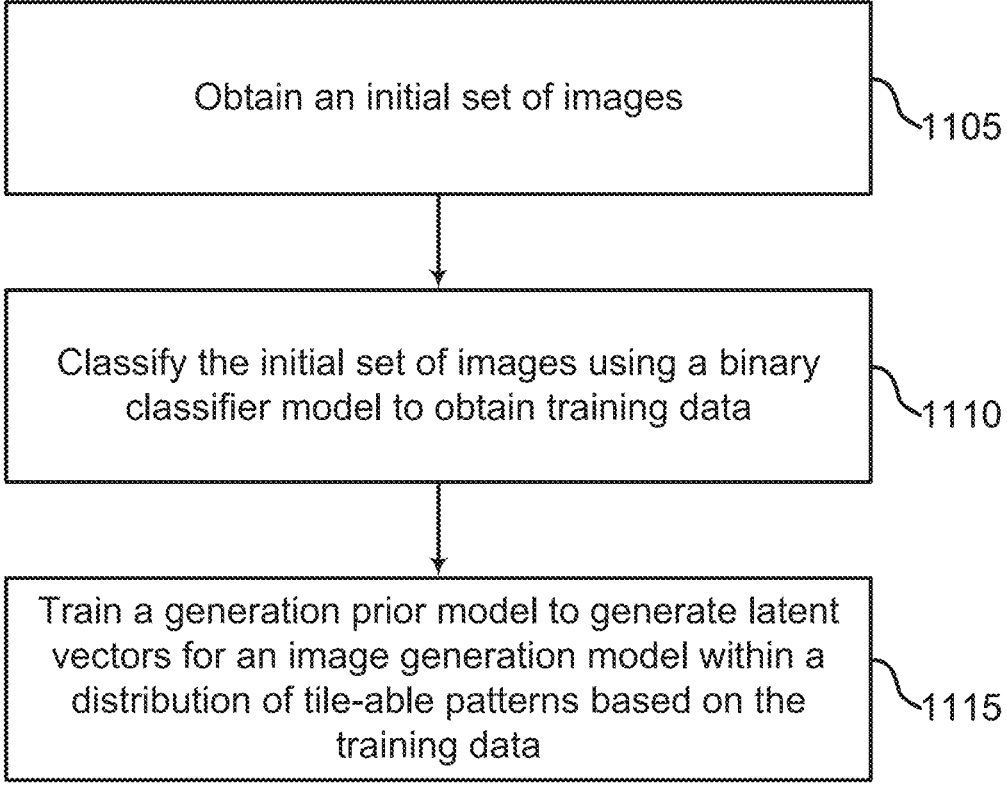
FIG. 11 shows an example of a method for generating training data according to aspects of the present disclosure.

FIG. 11 shows an example of a method 1100 for generating training data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system obtains an initial set of images. In some cases, the operations of this step refer to, or may be performed by, a pattern generation apparatus as described with reference to FIGS. 1 and 2. The initial set of images may be a large dataset of images that includes images that are both tile-able patterns and non-tile-able patterns, where non-tile-able patterns include images such as: photorealistic images, images of human models or actors, and images that are not seamless when tiled, and the like.

At operation 1110, the system classifies the initial set of images using a binary classifier model to obtain training data. In some cases, the operations of this step refer to, or may be performed by, the binary classifier model as described with reference to FIGS. 2, 12, and 13. In this example, the training data will now include only images that are tile-able patterns.

At operation 1115, the system trains a generation prior model to generate latent vectors for an image generation model within a distribution of tile-able patterns based on the training data. The image may train the image generation model according to the processes described above. However, unlike training the generation prior model, training the image generation model involves training the model to reach a target image, rather than a target vector. The target images may be the images from the training data. The training process may further include performing a forward diffusion process, which will be described in greater detail with reference to FIG. 14.

Figure 12:
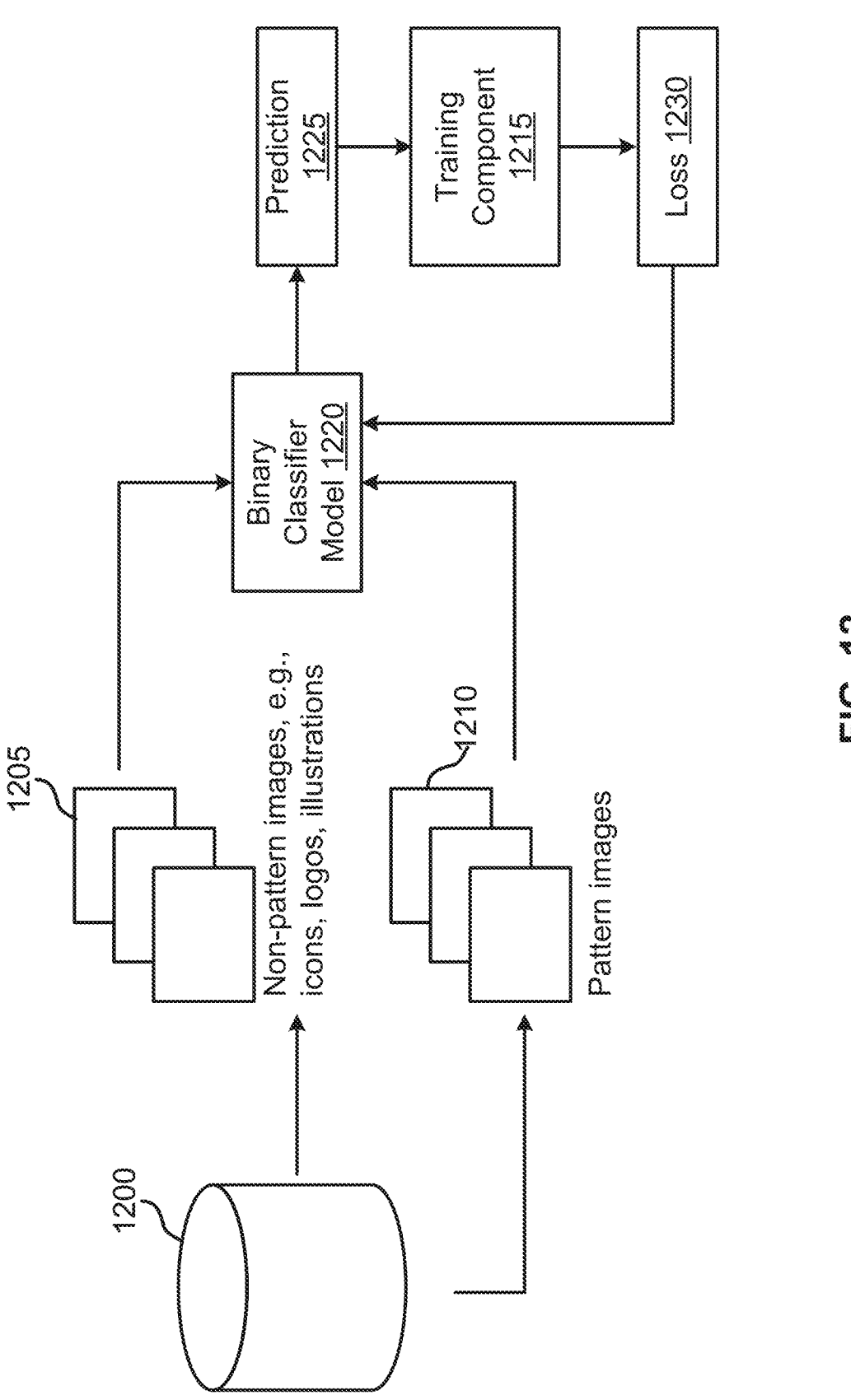
FIG. 12 shows an example of a training pipeline for a binary classifier model according to aspects of the present disclosure.

The binary classifier model described above may be trained to differentiate between tile-able patterns or images and non-tile-able images. FIG. 12 shows an example of a training pipeline for a binary classifier model 1220 according to aspects of the present disclosure. The example shown includes dataset 1200, negative class 1205, positive class 1210, training component 1215, binary classifier model 1220, prediction 1225, and loss 1230.

Figure 13:
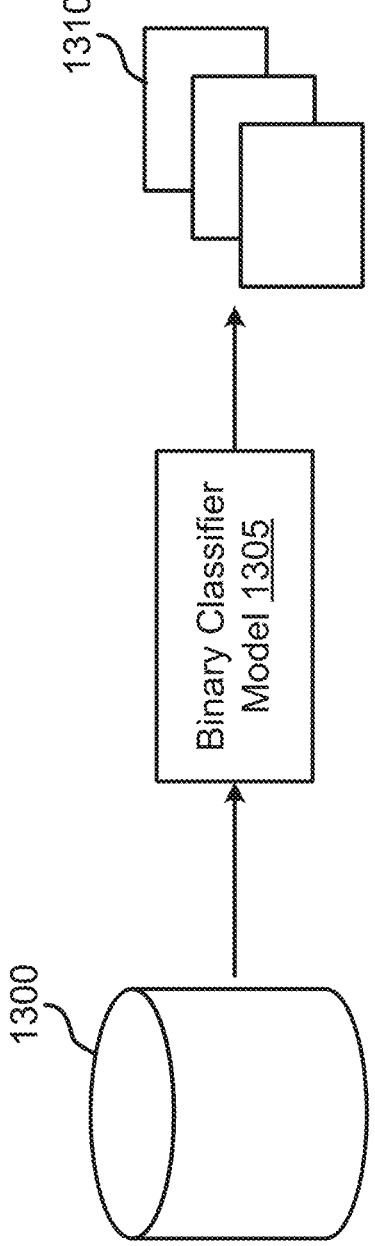
FIG. 13 shows an example of a pipeline for generating training data according to aspects of the present disclosure.

Dataset 1200 is an example of, or includes aspects of, the corresponding element described with reference to FIG. 13. Training component 1215 is an example of, or includes aspects of, the corresponding element described with reference to FIG. 2. Binary classifier model 1220 is an example of, or includes aspects of, the corresponding element described with reference to FIGS. 2 and 13.

According to some aspects, dataset 1200 includes a plurality of images. The plurality of images may include pattern and non-pattern images. In an example process, experts choose and manually label a number of non-pattern images as negative class 1205. Non-pattern images are images that do not tile seamlessly. Additional images may be included in negative class 1205, such as images that do not match a vector graphic pattern aesthetic, realistic images, and others. Experts additionally choose and manually label a number of pattern images as positive class 1210.

A binary classifier model 1220 receives images from both classes and makes a determination (e.g., prediction 1225) as to whether the image contains a suitable pattern. According to some aspects, prediction 1225 includes a scalar value that indicates the model's confidence that the processed image corresponds to a suitable pattern (e.g., is an example of the positive class 1210, and does not include characteristics or features from the distribution of negative class 1205). Based on the prediction 1225, training component 1215 computes loss 1230 and updates parameters of binary classifier model 1220 based on the loss. In at least one embodiment, the binary classifier model 1220 is implemented as an internal component of training component 1215.

Once trained, the binary classifier model can be used on a larger dataset to filter the dataset to produce training data, where the training data includes tile-able patterns. FIG. 13 shows an example of a pipeline for generating training data according to aspects of the present disclosure. The example shown includes dataset 1300, binary classifier model 1305, and training images including patterns 1310. Dataset 1300 is an example of, or includes aspects of, the corresponding element described with reference to FIG. 12. Binary classifier model 1305 is an example of, or includes aspects of, the corresponding element described with reference to FIGS. 2 and 12.

According to some aspects, dataset 1300 includes a plurality of images. The plurality of images may include diverse images such as images of patterns and non-patterns. Binary classifier model 1305, which has been trained according to the pipeline described with reference to FIG. 12, determines if an image from dataset 1300 is an image of a suitable pattern. Based on this determination, the image is either added (or not added) to training images including patterns 1310. Accordingly, embodiments are configured to generate quality training data that can be used to train the generation prior model and the image generation model to generate tile-able patterns.

Figure 14:
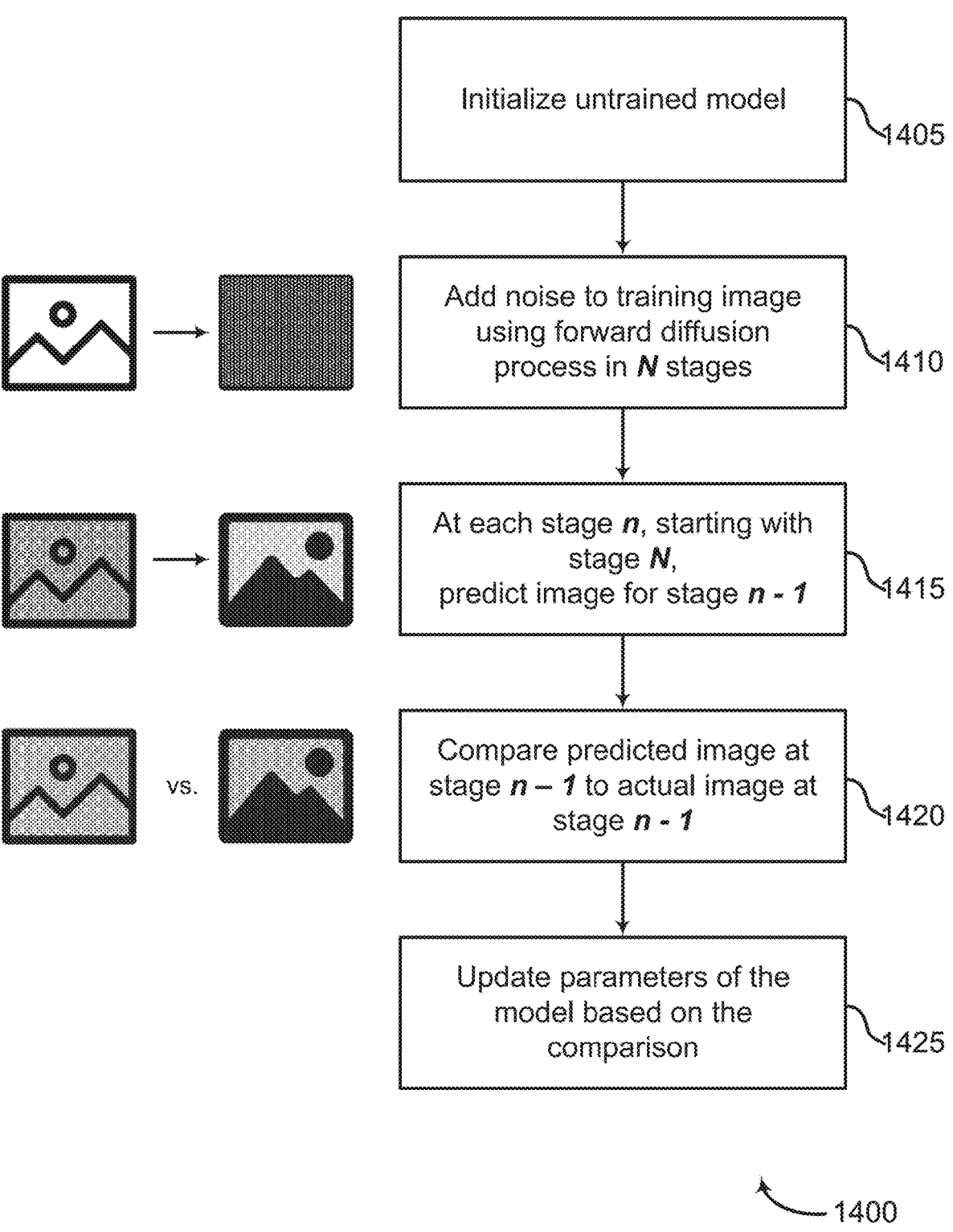
FIG. 14 shows an example of a method for training a diffusion model according to aspects of the present disclosure.

FIG. 14 shows an example of a method 1400 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A diffusion model may be trained using both a forward and a reverse diffusion process. In one example, the user initializes an untrained model, e.g. at operation 1405. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages at operation 1410. In some cases, the forward diffusion process is a fixed process where Gaussian noise is successively added to an image. In latent diffusion models, the Gaussian noise may be successively added to features in a latent space.

In operation 1415, at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1420, the training system compares predicted image (or image features) at stage n−1 to an actual image (or image features), such as the image at stage n−1 or the original input image. For example, given observed data x, the diffusion model may be trained to minimize the variational upper bound of the negative log-likelihood −log $p_\theta(x)$ of the training data. At operation 1425, the training system then updates parameters of the model based on the comparison. For example, parameters of a U-Net may be updated using gradient descent. Time-dependent parameters of the Gaussian transitions can also be learned.

FIG. 15 shows an example of a method 1500 for training a generation prior model and an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system obtains training data including a set of images depicting tile-able patterns and a set of text descriptions corresponding to the set of images, respectively. In some cases, the operations of this step refer to, or may be performed by, a pattern generation apparatus as described with reference to FIGS. 1 and 2.

At operation 1510, the system trains a generation prior model to generate latent vectors for an image generation model within a distribution of tile-able patterns based on the training data. In some cases, the operations of this step refer to, or may be performed by, a training component as described with reference to FIGS. 2 and 12. For example, the system may train a generation prior model to produce target latent vectors that represent images from the training data from text embeddings of the text descriptions from the training data. Additional detail regarding an example training process is provided with reference to FIG. 10.

At operation 1515, the system generates a predicted latent vector using the generation prior model. According to some aspects, the generation prior model is configured to perform a diffusion process to generate the predicted latent vector within a region of latent space, where the region encompasses vector representations of tile-able patterns.

At operation 1520, the system generates a predicted image based on the latent vector using the image generation model. In some cases, the operations of this step refer to, or may be performed by, an image generation model as described with reference to FIGS. 2 and 3. The image generation model may also perform a diffusion process to generate the predicted image.

At operation 1525, the system computes a loss function based on the predicted image. In some cases, the operations of this step refer to, or may be performed by, a training component as described with reference to FIGS. 2 and 12. For example, the loss function may be a pixel-based loss function that compares the structure of the predicted image to the structure of the image from training data, or may be a feature-based loss function that compares embeddings of the predicted image to embeddings of the training image.

FIG. 16 shows an example of a computing device 1600 according to aspects of the present disclosure. The example shown includes computing device 1600, processor(s), memory subsystem 1610, communication interface 1615, I/O interface 1620, user interface component(s), and channel 1630.

In some embodiments, computing device 1600 is an example of, or includes aspects of, pattern generation apparatus 100 of FIG. 1. In some embodiments, computing device 1600 includes one or more processors 1605 that can execute instructions stored in memory subsystem 1610 to obtain a text prompt; generate, using a generation prior model, a latent vector based on the text prompt, wherein the generation prior model is trained to output vectors within a distribution of tile-able patterns; and generate, using an image generation model, an output image based on the latent vector, wherein the output image comprises a tile-able pattern including an element from the text prompt.

According to some aspects, computing device 1600 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1615 operates at a boundary between communicating entities (such as computing device 1600, one or more user devices, a cloud, and one or more databases) and channel 1630 and can record and process communications. In some cases, communication interface 1615 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1620 is controlled by an I/O controller to manage input and output signals for computing device 1600. In some cases, I/O interface 1620 manages peripherals not integrated into computing device 1600. In some cases, I/O interface 1620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or via hardware components controlled by the I/O controller.

According to some aspects, user interface component(s) 1625 enable a user to interact with computing device 1600. In some cases, user interface component(s) 1625 include an audio device, such as an external speaker system, an external display device such as a display screen, an input device (e.g., a remote control device interfaced with a user interface directly or through the I/O controller), or a combination thereof. In some cases, user interface component(s) 1625 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining a text prompt;
   generating, using a generation prior model, a latent vector based on the text prompt by sampling the latent vector from a learned cluster in an embedding space, wherein the generation prior model is trained to output vectors within a distribution of tile-able patterns corresponding to the learned cluster, and wherein the learned cluster includes vector representations of tile-able images; and
   generating, using an image generation model, an output image based on the latent vector, wherein the output image comprises a tile-able pattern including an element from the text prompt.

2. The method of claim 1, wherein generating the output image comprises:
   performing a circular convolution.

3. The method of claim 1, further comprising:
   encoding the text prompt to obtain a text embedding, wherein the latent vector is generated based on the text embedding.

4. The method of claim 1, further comprising:
   applying the output image to an image canvas using a brush tool.

5. The method of claim 1, further comprising:
   generating a plurality of latent vectors based on the text prompt; and
   computing a plurality of similarity scores corresponding to the plurality of latent vectors, respectively, wherein the latent vector is selected from the plurality of latent vectors based on the plurality of similarity scores.

6. The method of claim 1, wherein:
   the generation prior model is trained based on a training set including a plurality of images depicting tile-able patterns.

7. The method of claim 1, wherein:
   the output image comprises a plurality of repetitions of the tile-able pattern.

8. The method of claim 1, wherein generating the latent vector further comprises:
   performing a reverse diffusion process.

9. A method comprising:
   obtaining training data including a plurality of images depicting tile-able patterns and a plurality of text descriptions corresponding to the plurality of images, respectively; and
   training a generation prior model to generate latent vectors for an image generation model within a distribution of tile-able patterns based on the training data by sampling the latent vectors from a learned cluster in an embedding space, wherein the learned cluster includes vector representations of tile-able images.

10. The method of claim 9, wherein training the generation prior model further comprises:
   generating a predicted latent vector using the generation prior model;
   generating a predicted image based on the latent vector using the image generation model; and
   computing a loss function based on the predicted image.

11. The method of claim 10, wherein generating the predicted image comprises:
   performing a circular convolution.

12. The method of claim 9, further comprising:
   encoding each of the plurality of text descriptions to obtain a plurality of text embeddings, wherein the training is based on the plurality of text embeddings.

13. The method of claim 9, wherein obtaining the training data comprises:
   obtaining an initial set of images; and
   classifying the initial set of images using a binary classifier model to obtain the plurality of images.

14. An apparatus comprising:
   at least one processor;
   at least one memory including instructions executable by the at least one processor;
   the apparatus further comprising a generation prior model including parameters stored in the at least one memory and trained to output vectors within a distribution of tile-able patterns by sampling the latent vector from a learned cluster in an embedding space, wherein the learned cluster includes vector representations of tile-able images; and
   an image generation model including parameters stored in the at least one memory and trained to generate tile-able patterns based on output from the generation prior model.

15. The apparatus of claim 14, wherein:
   the generation prior model comprises a diffusion model.

16. The apparatus of claim 14, wherein:
   the image generation model comprises a diffusion model.

17. The apparatus of claim 14, wherein:
   the image generation model includes a circular convolution layer.

18. The apparatus of claim 14, further comprising:
   a text encoder configured to encode a text prompt to obtain a text embedding.

19. The apparatus of claim 14, further comprising:
   a training component configured to train the generation prior model.

20. The apparatus of claim 19, further comprising:
   a binary classifier model configured to filter a dataset to obtain training data.

* * * * *